United States Patent [19]

Kolk et al.

[11] Patent Number: 4,658,538

[45] Date of Patent: Apr. 21, 1987

[54] MACHINE FOR FORMING WIRE ARCHES, AND INSTALLING THE ENDS OF THE ARCHES IN THE GROUND

[75] Inventors: Howard A. Kolk; Robert D. Kolk, both of Holland, Mich.

[73] Assignee: Mechanical Transplanter, Holland, Mich.

[21] Appl. No.: 788,018

[22] Filed: Oct. 16, 1985

[51] Int. Cl.⁴ .............................................. A01G 13/02
[52] U.S. Cl. ......................................... 47/1 R; 47/29
[58] Field of Search ................... 140/93 R; 47/1 R, 9, 47/2, 26, 29, 28

[56] References Cited

U.S. PATENT DOCUMENTS 4,186,520  2/1980  Alper et al. ............................ 47/1 R

FOREIGN PATENT DOCUMENTS

| 2235642 | 3/1975 | France | 47/9 |
| 2451156 | 11/1980 | France | 47/29 |
| 2464024 | 4/1981 | France | 47/29 |
| 685457 | 1/1953 | United Kingdom | 47/29 |

Primary Examiner—Lowell A. Larson
Attorney, Agent, or Firm—Glenn B. Morse

[57] ABSTRACT

A machine bends pieces of wire into an arch configuration, and then inserts the ends of the arch into the ground to form a support for a shelter film protecting a row of plants. An orbital system rotating on an axis parallel to the axis of ground wheels permits the arches to be inserted at close to zero speed relative to ground as the machine moves. The preferred form of the machine installs the film over the arches.

10 Claims, 9 Drawing Figures

MACHINE FOR FORMING WIRE ARCHES, AND INSTALLING THE ENDS OF THE ARCHES IN THE GROUND

BACKGROUND OF THE INVENTION

A comparatively recent agricultural technique for growing row plants involves the installation of a tent-like tunnel of transparent film over the planted rows to provide shelter for the growing plants. The film has usually been supported by wire arches bent to shape and installed by hand at selected spacing along the rows. The initially straight (or possibly somewhat curved from prior use) pieces of wire have usually been carried in some makeshift manner, and the wire bent into the arch just prior to poking the ends into the ground. This has been done either by one man; or by two men. In the latter case, one is positioned at each end of the wire as they walk along abreast. The manual labor in the transporting, bending and installation of these wire arches has been a limiting factor on the use of the system.

SUMMARY OF THE INVENTION

A machine embodying the present invention is preferably built as an attachment to a standard farm tractor, and has ground wheels that position the mechanism and provide the necessary power to operate it as the tractor moves forward. Wire pieces are held in storage position, and are fed individually to the machine by an operator riding on top of it. The pieces are temporarily supported in a position to be engaged by opposite orbital bending and clamping devices that establish and maintain the arch configuration in a vertical plane. In the course of generating the clamping action, the wire pieces are bent over abutments by a cam-controlled arm that releases the arches after they are installed. The orbital motion causes the arches to be inserted into the ground in a rearward movement with respect to the vehicle that is about equal and opposite to the forward ground speed.

DESCRIPTION OF THE DRAWINGS

FIGS. 6, 7, and 8 are drawn to an enlarged scale over that of the previous views.

DESCRIPTION OF THE PREFERRED EMBODIMENT

Figure 1:
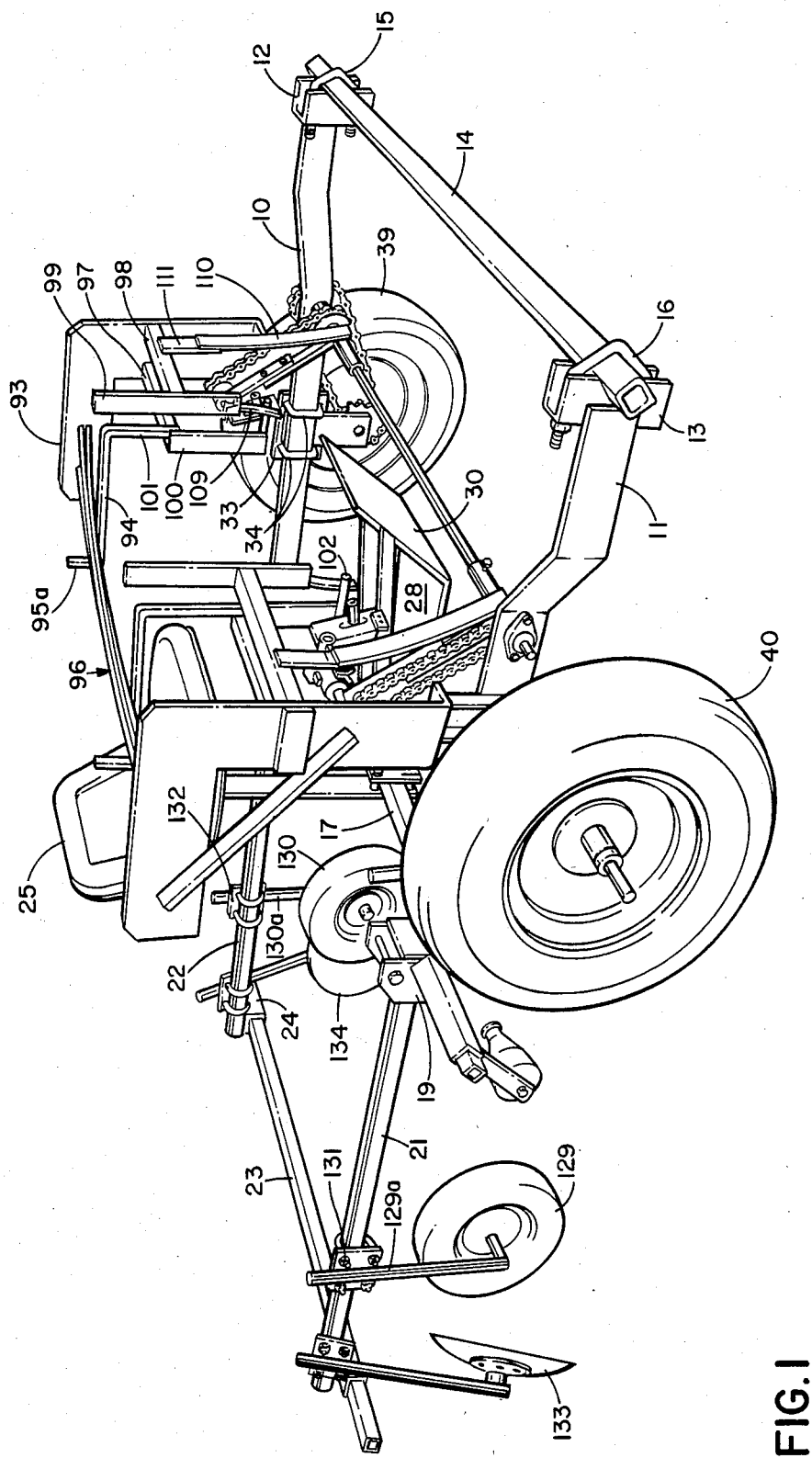
FIG. 1 is a perspective view from the front quarter showing the machine separated from a tractor on which it would normally be mounted.
Figure 5:
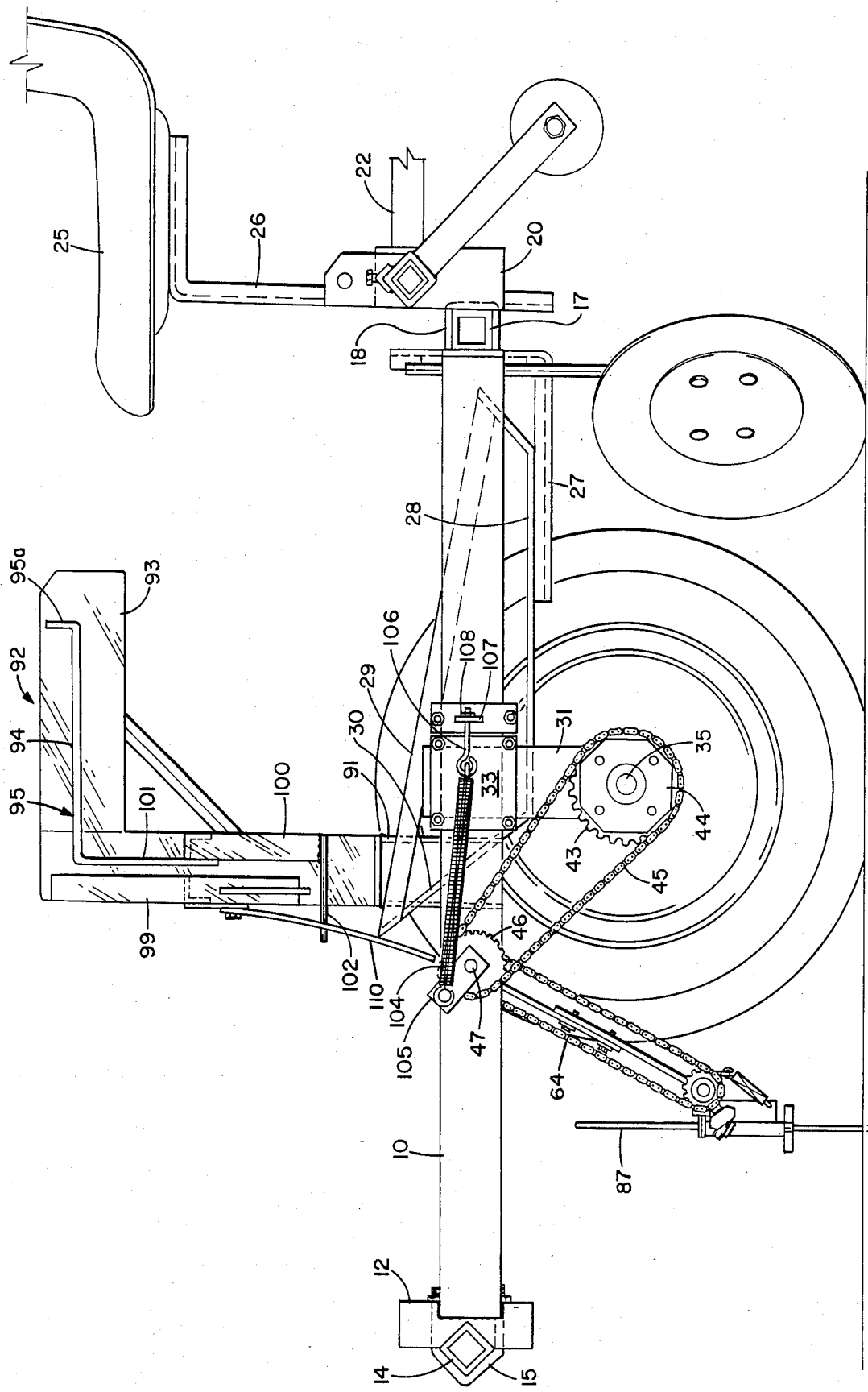
FIG. 5 is a side elevation of the machine, with the nearest ground wheel removed.

Referring particularly to FIGS. 1 and 5, the illustrated machine has a very simple frame structure composed of steel bars and tubes held together with "U"-bolts. The side bars 10 and 11 are welded respectively to the brackets 12 and 13, which are essentially channels with notches in the forward-facing flanges for receiving a corner of the square steel tube 14 forming the front transverse member of the frame. The tube 14 is secured by the U-bolts 15 and 16, and is the member to which a coupling assembly (not shown) will be secured for mounting the illustrated machine on a conventional farm tractor. At the rear of the main frame, the square tube 17 forms the transverse member, and is secured in position by U-bolts as shown at 18 in FIG. 5. Brackets as shown at 19 and 20 (in FIGS. 1 and 5, respectively) are bolted or welded to the transverse tube 17, and form the securing points for the trailing beams 21 and 22 that support the components of the film-depositing system. The rear extremities of these are interconnected by the transverse bar 23 carried in receptacles as shown at 24 for slideable lateral adjustment. This adjustment may be secured by set screws (not shown) or cross-bolts.

An operator's seat 25 is supported on the horizontal leg of the L-shaped arm 26, the vertical portion of which is bolted or clamped to the transverse member 17. A second L-shaped member shown at 27 in FIG. 5 has its vertical portion bolted or clamped to the transverse member 17, with the horizontal portion supporting the pan 28 forming the operator's footrest. Opposite side diagonals as shown at 29 in FIG. 5, together with the upwardly-inclined portion 30 of the pan, confine the operator's feet so that they do not accidentally become involved with the moving components of the machine.

A pair of short vertical bars 31 and 32 are secured to opposite sides of the frame members 10 and 11, respectively, by clamping plates as shown at 33 secured by pairs of U-bolts 34. These short vertical bars support the stub shafts 35 and 36, which are welded in position. The stub shafts carry the rotatable sleeves 37 and 38 secured to hub assemblies for the wheels shown at 39 and 40. Adjustable collars as shown at 41 and 42 are preferably used for maintaining the lateral position of the wheels with respect to the structure of the machine. The power required to operate the working components of the machine is derived from the sprocket 43 welded to the sleeve 37 associated with the wheel 39. Referring to FIG. 5, the flange 44 is also welded to the sleeve 37, and this flange is bolted to the central web of the wheel 39 in the usual manner. The opposite wheel 40 is similarly secured to the sleeve 38, but is not responsible for any of the power transfer. The chain 45 transfers power from the sprocket 43 to the sprocket 46 secured to the transverse shaft 47 rotatably carried in the bearings 48 and 49 respectively mounted on the bars 10 and 11 of the main frame.

Figure 6:
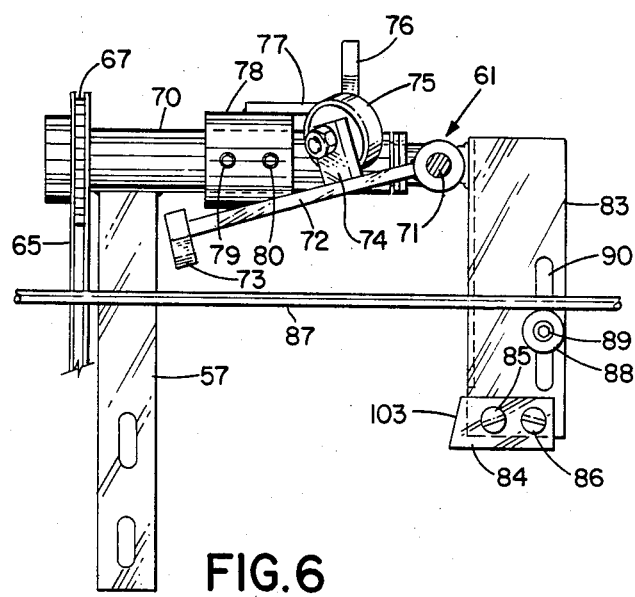
FIG. 6 is a front view of the clamping mechanism responsible for bending and holding the wire work pieces.
Figure 8:
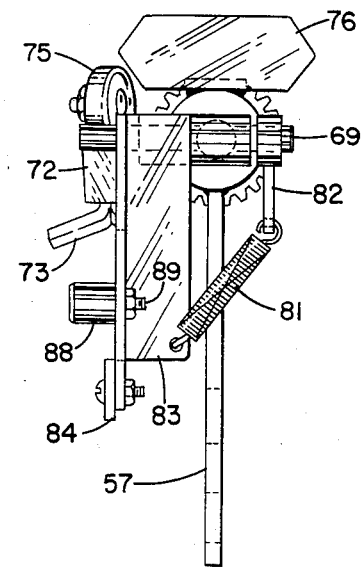
FIG. 8 is a side elevation of the mechanism shown in FIGS. 6 and 7.
Figure 7:
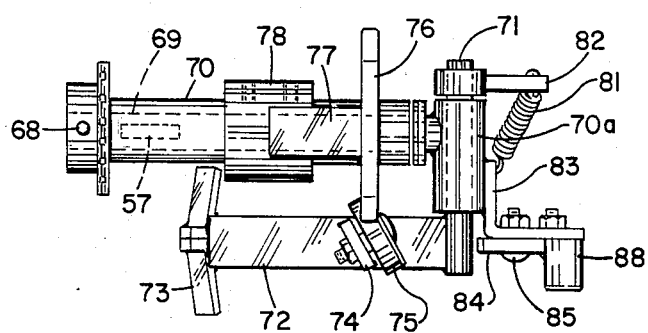
FIG. 7 is a top view of the mechanism shown in FIG. 6.

The shaft 47 carries the principal operating components of the machine. The sleeves 50 and 51 are adjustably secured with respect to the shaft 47 by the set screws 52 and 53. The inner radial arm sections 54 and 55 are respectively welded to the sleeves 50 and 51, and the set screws 52 and 53 permit the arm sections 54 and 55 to be placed in a coplanar relationship that is properly interrelated with the bending and clamping mechanism responsible for forming and installing the wire arches. These components are carried by the outer radius arms sections 56 and 57 secured to the inner sections by bolts as shown at 58 and 59 (referring to FIGS. 2, 3, and 4). These sections of the machine are generally indicated at 60 and 61, and are shown in greater detail in FIGS. 6, 7, and 8.

The sprockets 62 and 63 are firmly secured to the frame bars 10 and 11, and engage the chains 64 and 65. The sprockets 66 and 67 also engage these chains, respectively, and are pinned as shown at 68 in FIG. 7 to the short planetary shafts 69. This relationship results in a planetary movement of the shafts 69 with respect to the shaft 47. The construction of the mechanisms indicated at 60 and 61 are the same, except for a right-left relationship. The shafts are carried by the bearings 70 secured to the outer extremities of the outer radius arm sections 56 and 57, respectively. The transverse fulcrum sections 70a are secured to the inner ends of the shafts 69, and rotatively carry the clamping shafts 71. Radial clamping arms 72 are secured to the forward ends of these shafts 71, and carry the clamping jaws 73. These arms also carry the brackets 74 providing for the rotatable mounting of the cam follower rollers 75. These rollers cooperate with cam plates 76 carried on arms 77 secured to the sleeves 78 adjustably secured with respect to the bearings 70 by the set screws 79 and 80. This adjustment permits the interaction of the rollers 75 and the cams 76 to take place at a selected position of the arms 57. The pivotal movement of the clamping arms 72 induced by the rollers 75 is opposed by the action of the biasing springs 81 (refer to FIG. 8) connected to the arm 82 secured to the shafts 71. The opposite ends of the springs 81 are connected to the front-rear flanges of the holding arms formed by the angle members 83 welded to the fulcrum sections 70a. The opposite legs of these angles support the blocks 84, which are secured with the screws 85 and 86. The left-hand extremity of this block, as viewed in FIG. 6, cooperates with the jaw 73 on the clamping arm to grasp the wire work piece 87 firmly to permit the machine to thrust the arch into the ground. In the process of clamping the wire against the block 84, the wire is first bent around the adjustable abutment 88 secured to the angle member 83 with the bolt 89 within a range of adjustment provided by the slot 90.

On opposite sides of the machine, vertical channels as shown at 91 in FIG. 5 are welded to the side bars 10 and 11 of the frame. These channels form the supporting structure for the wire-storage rack generally indicated at 92, and for the guideway conducting the individual wire work pieces from storage to a position where they are picked up by the mechanism shown in FIGS. 6, 7, and 8. L-shaped side plates as shown at 93 are welded to the channels 91 to form stops for positioning the wire work pieces laterally as they rest upon the horizontal leg 94 of the bars 95. The rear extremities of these bars are turned upward as shown at 95a to form a stop limiting the rearward movement of the wires. The wires are shown in storage position in FIG. 1 at 96. Spaced horizontal bars as shown at 97 and 98 in FIG. 1 are welded to the plates 93. Vertical bars 99 are welded to the inner extremities of the front bars 98, and shorter bars 100 are welded to the inner ends of the bars 97, along with the vertical legs 101 of the bars 94. The vertical space between the bars 99, and the combination of the bars 100 and the vertical legs 101, forms a vertical guideway for conducting the wire work pieces downward to the projecting rods 102, where the wires rest until they are picked off by the operating components of the machine.

Figure 2:
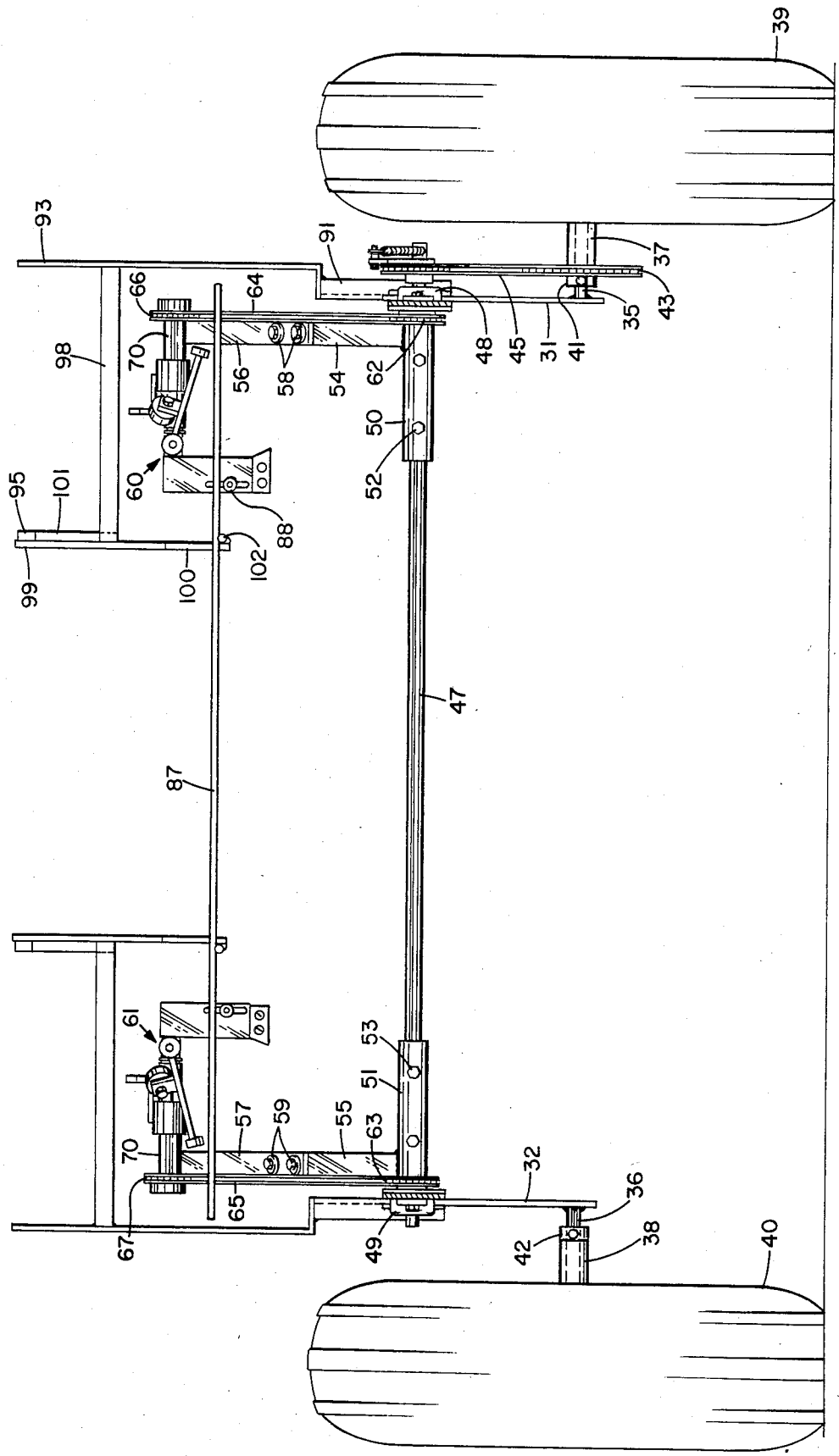
FIG. 2 is a front elevation of the portion of the machine responsible for bending and installing the wire arches, shown in the initial position in which the machine receives the wire pieces.
Figure 3:
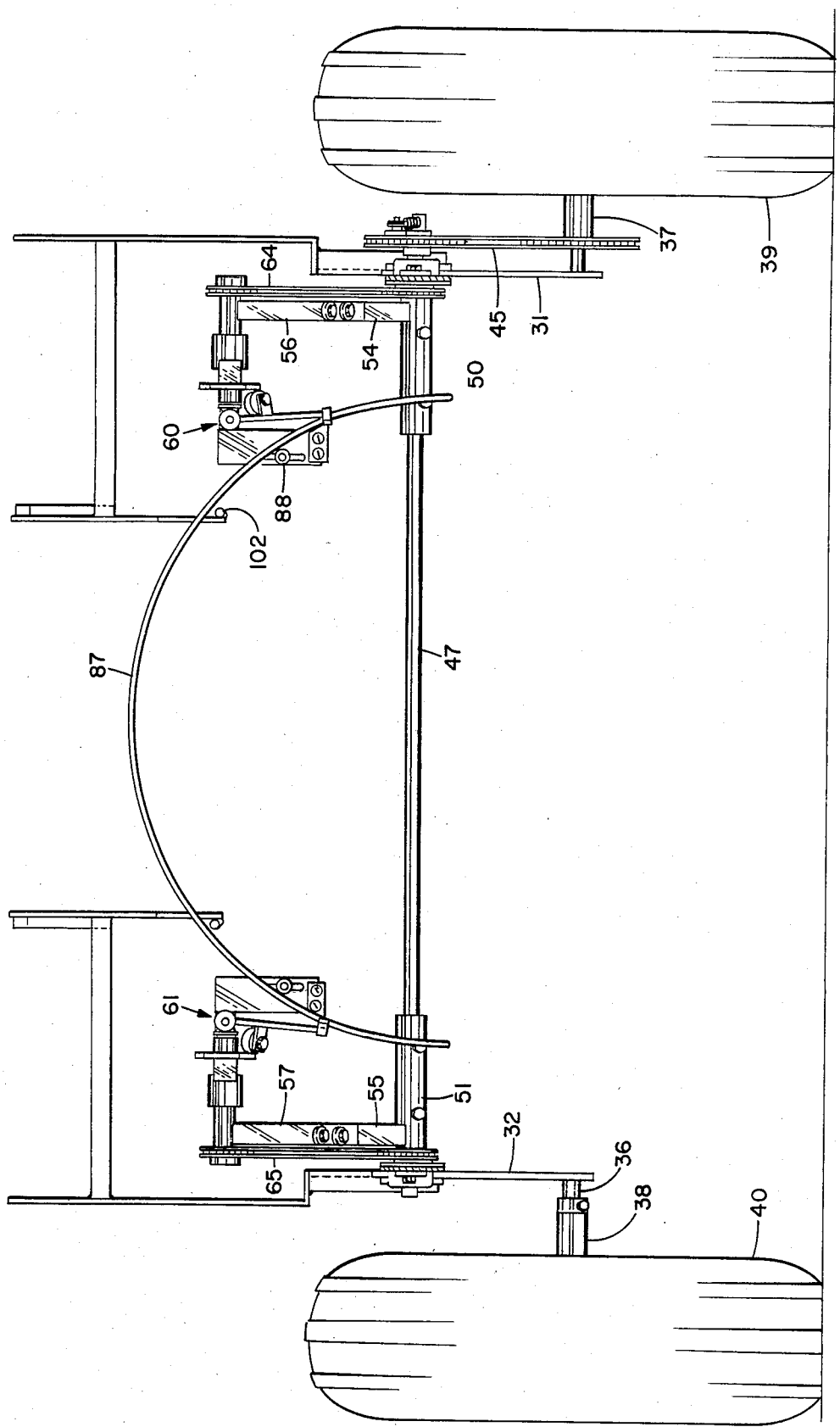
FIG. 3 is a view of the structure shown in FIG. 2, but shown in a successive position after the wire pieces have been bent into an arch configuration.
Figure 4:
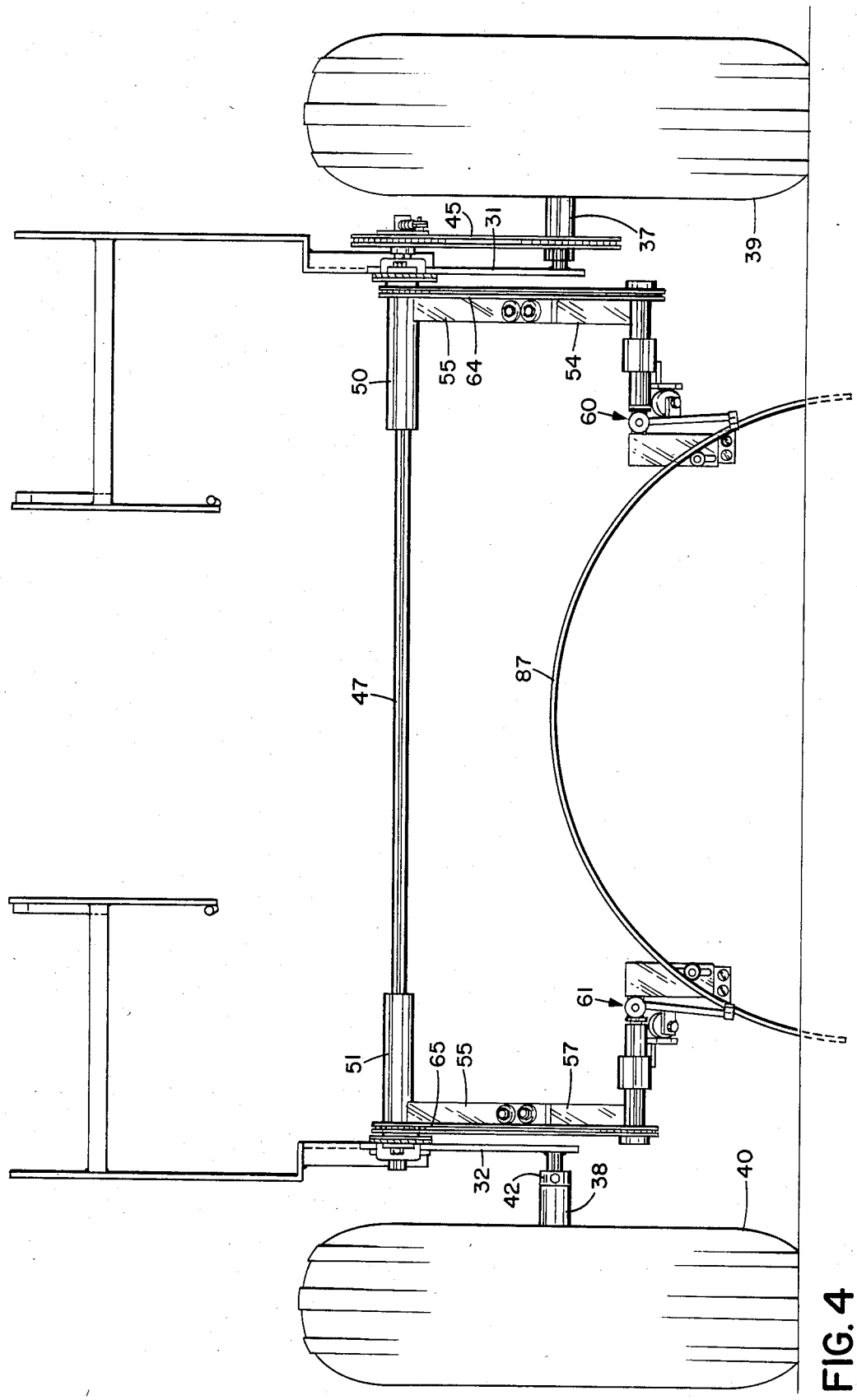
FIG. 4 is a view of the structure shown on FIGS. 2 and 3, shown in the position corresponding to the installation of the ends of the arches into the ground.

The sequence of operations is best illustrated in FIGS. 2, 3, and 4. In FIG. 2, an operator has pushed a piece of wire 87 out of storage position, from which it is dropped down to the projecting rods 102, which support the wire at a level just high enough for the abutments 88 to move underneath. The wire is then engaged by the front face of the members 83. At that instant the bending and clamping action begins. Since the cam plates 76 move in fixed relationship with the radius arms 54–56 and 55–57, they are rotatably positioned by appropriate adjustment about the bearings 70, which is maintained by the set screws 79 and 80, such that the cam plates engage the rollers 75 at about the instant the wire pieces 87 are engaged by the faces of the members 83. The action of the cams 76 induces a counterclockwise rotation, of the clamping arms 72, as viewed in FIG. 6, bringing the clamping jaws 73 downward into engagement with the wire. The jaws 73 have a V-shaped configuration, as shown best in FIG. 8, causing the wire to be centered in the central portion of the jaw as the wire is engaged and bent downward about the abutments 88. This condition is illustrated in FIG. 3. During this movement, the effect of the chains 64 and 65, which associate sprockets of the same size, is to maintain the front face of the members 83 close to a vertical plane throughout this orbital movement. As the rotation of the clamping arms continues, the jaws finally shove the wires against the fixed clamping jaws so that pressure is exerted between the moving jaws 73 and the edges 103 of the blocks 84 (see FIG. 6). As full pressure against the wire develops, the wire is preferably lifted off of the abutments 88. Whether or not this takes place, the resulting arch configuration of the wire is easily thrust into the ground as shown in FIG. 4. The thrusting of the wire ends into the ground necessitates that the action take place at close to zero relative ground speed to avoid distorting the wire, or tipping it out of position in the ground. This relationship is maintained by a selection of the ratios between the sprockets 43 and 46 such that the length of the radius arms, as they rotate about the axis of the shaft 47, produces a rearward velocity at the clamping mechanism equal to the forward velocity of the ground wheels. This relationship, of course, exists only at the downward portion of the rotation of the radius arms. During this period, the movement of the cam plates 76 releases the rollers 75, and the clamping arms 72 spring free of the wires under the action of the springs 81. The continued rearward rotation of the radius arms moves the clamping mechanism back and away from the installed wire. While the movement of the clamping mechanisms approaches zero ground speed, it is preferable that there be a slight rearward velocity sufficient to assure clearance from the wire as the radius arms continue with their rearward position. The abutments 88 must be swung back to clear the installed wire. Where the wire has been lifted well off the abutments 88 in the clamping process, this is less critical, as more clearance is present. The clamping mechanisms will be raised as the radius arms continue to rotate rearwardly and upwardly to the point where the installed wire is easily cleared. The arms then continue their rotation to where they can intercept and manipulate the next wire that will have been dropped down into position. During this rotary movement, the radius arms and clamping mechanisms move through the space between the bars 99 and 100, and the plates 93.

Applicant's experience with this type of farm machinery has established that it is occasionally necessary to make allowances for the effect of wear upon chain drive systems of this type. To avoid the development of objectionable lost motion, the tension spring 104 (refer to FIG. 5) has been added to the mechanism. This spring extends from the short crank arm 105 fixed with respect to the shaft 47 and the eyebolt 106 engaging the tab 107 of the bracket 108 secured to the side bar 10 of the frame. The eyebolt is adjustable to control the tension of the spring, the effect being to eliminate the lost motion during the active portion of the rotation of the radius arms. The spring 104 and its associated components are optional. In the presence of some degree of lost motion, the position of the crank arm 105 can be selected such as to produce a snap-back action tending to improve the release of the clamping mechanism from the installed wires. This will occur if the spring 104 passes over-center with respect to the axis of the shaft 47 at the time of the release of the wires from the clamping mechanisms.

Experience in the operation of this machine has established that reliability and freedom from malfunction are improved by providing resilient retaining flaps for releaseably retaining the wire while its rests on the projecting rods 102. These are shown at 109 in FIG. 1, and are essentially strips of heavy fabric secured to the lower extremity of the members 99, which are above the path of movement of the clamping mechanisms. It has also been established that the presence of the resilient flaps 110, which are secured to the similarly positioned plates 111 welded to the members 98, improves the behavior of the wires during the manipulation by the clamping mechanisms. These flaps are positioned to engage the wires during the forward and downward movement while they are in the grasp of the clamping mechanisms, and tend to prevent a whipping action which interferes with accurate placement.

Figure 9:
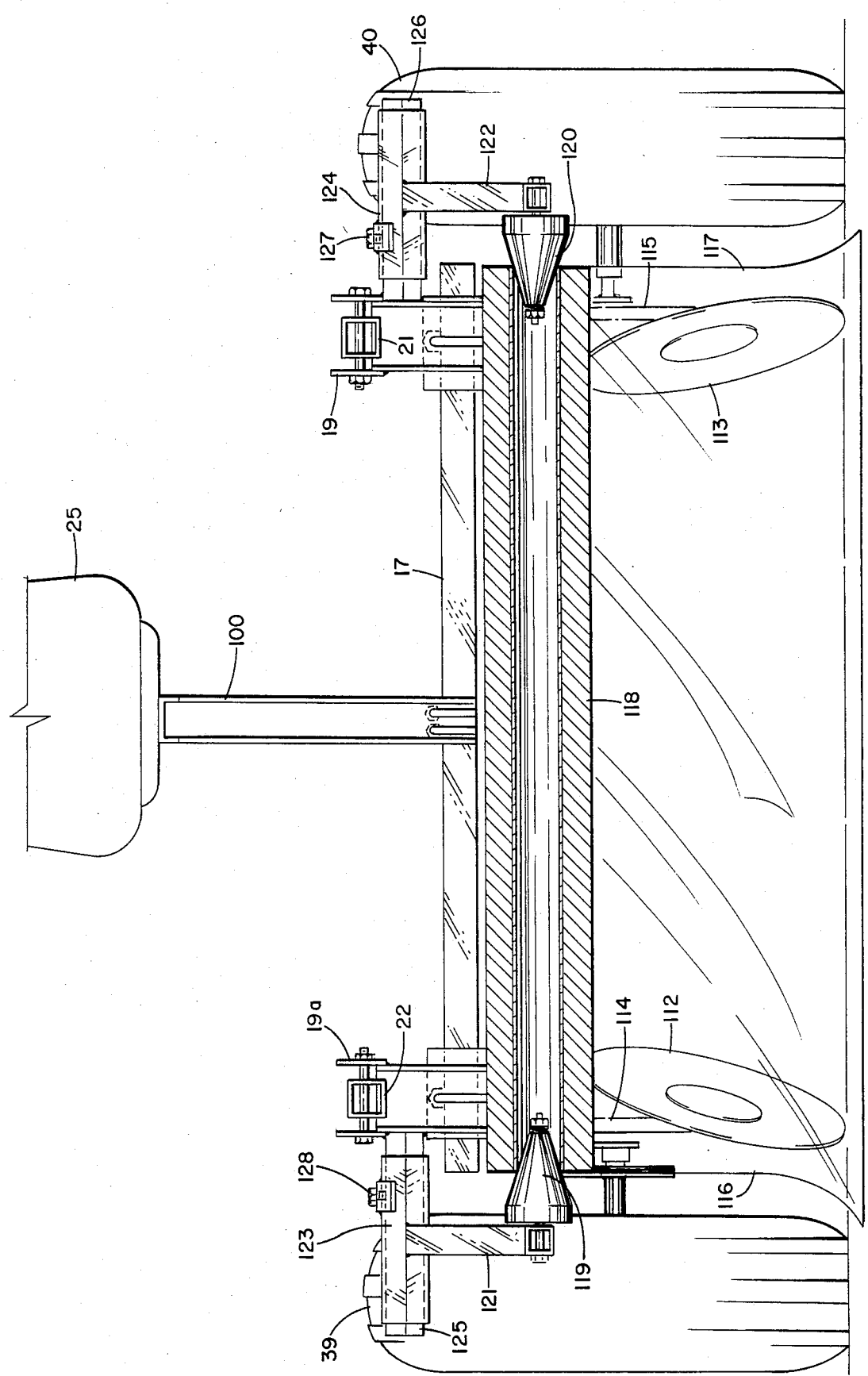
FIG. 9 is a rear view of the machine on a plane through the axis of the roll of film carried by the machine.

It is preferable to combine the machine described above with a system for laying out a sheet of plastic film over the arches that have been installed. This mechanism can be of a conventional type, and forms no part of the present invention. For purposes of convenience, however, the combination of these two mechanical systems produces a very compact and economical machine. The film-laying system is shown best in FIG. 9, which should be viewed in conjunction with FIG. 1. The furrow-opening discs 112 and 113 are mounted in the usual fashion on the struts 114 and 115 secured to the frame side members 10 and 11 with clamps (not shown) so that they are adjustable vertically. These discs open furrows in positions to receive the edges 116 and 117 of a sheet of plastic film as it is pulled off from the roll 118. The roll has a tubular core, and is held in position by the spindles 119 and 120 carried by the ends of the arms 121 and 122 provided with cylindrical sleeves 123 and 124 mounted for rotative and axial adjustment on the spindles 125 and 126 secured to the brackets 19 and 19a. The set screws 127 and 128 lock the sleeves and arms in a selected position to establish the corresponding position of the roll 118. Referring to FIG. 1, the wheels 129 and 130 mounted on the struts 129a and 130a depress the edges of the plastic into the furrows opened by the discs 112 and 113. The placement of the wheels 129 and 130 is controlled by the clamping brackets 131 and 132 embracing the trailing beams 21 and 22. The second set of discs 133 and 134 is similarly mounted behind the wheels to force the ridge of dirt established by the opening discs 112 and 113 back into the furrow to anchor the edges of the plastic material in place. This completes a tunnel-like enclosure over the tops of the row of plants.

This compact machine efficiently performs a single-pass operation forming and installing the arches, and applying the plastic covering over them. All this is accomplished with a single operator (in addition to the operator driving this tractor) with a minimum demand of skill and training on this operator. Experience with the machine has established that it is capable of handling pieces of wire that have been used previously, and which have a small degree of curvature in them as a result of having been formed into the arch configuration in an earlier installation. There is a limit to the extent of the curvature that can be accommodated by the machine, however, and attention should be given to providing wire pieces that are not sufficiently curved to interfere with the engagement of the clamping devices, and their subsequent manipulation. For example, a piece of wire suspended on the projecting rods 102 should not have sufficient curvature that it will assume a position underneath the abutments 88 on the clamping devices, and would therefore not be properly picked up. An excessive degree of curvature also could conceivably interfere with the engagement of the clamping jaws, if the excessively curved rods were rotated somewhat about a horizontal axis as they were held by the machine. The exact degree of curvature of the rods that the machine will tolerate can only be controlled by experiment with the particular machine involved. If necessary, a simple straightening operation can restore the rods to a condition that the machine can accommodate.

We claim:

1. A machine for forming and installing wire arches, comprising:

a frame:

ground-engaging wheel means rotatably mounted on said frame;

transverse shaft means rotatably mounted on said frame parallel to the axis of said wheel means;

a pair of radius arms secured to said shaft adjacent the opposite ends thereof, respectively, in substantially coplanar relationship;

a planetary shaft rotatably mounted on each of said radius arms on an axis substantially parallel to said transverse shaft means;

orbital positioning means interconnecting said planetary shafts and said frame, and adapted to maintain a predetermined rotary angular position of said planetary shafts with respect to said frame;

a holding arm secured to and extending radially from each of said planetary shafts, each of said holding arms having an abutment projecting tangentially with respect to said planetary shafts;

cam means normally fixed with respect to each of said radius arms;

a fulcrum member fixed with respect to said holding arm and said planetary shaft;

a clamping arm pivotally mounted on said fulcrum member, and having a clamping jaw disposed to press said wire against said abutment on rotation of said clamping arm, said clamping arm also having cam follower means disposed to interact with said cam means on rotation of said radius arms to bend a wire piece against said abutment to produce an arch configuration having its ends extending downward, and then grasp said wire;

wire-support means disposed to position a wire member for engagement with said holding arms above said abutments at a selected position during the rotation of said radius arms; and drive means for rotating said transverse shaft in predetermined relationship to said ground-engaging wheel means.

2. A machine as defined in claim 1, wherein said orbital positioning means includes a first sprocket (fixed with respect to said frame), a second sprocket (fixed with respect to said planetary shaft), and chain means interconnecting said sprockets.

3. A machine as defined in claim 1, additionally including biasing means urging said clamping arms away from said holding arms.

4. A machine as defined in claim 1, wherein said wire-support means is at least one member fixed with respect to said frame and extending transversely with respect to, and disposed above, said shaft.

5. A machine as defined in claim 4, additionally including members fixed with respect to said frame and forming a vertical guideway for conducting wire pieces downward to said support means.

6. A machine as defined in claim 5, additionally including a storage rack for wire pieces, said rack being secured to said frame and extending to said guideway.

7. A machine as defined in claim 1, additionally including flexible members mounted on said frame and disposed to form a yieldable barrier to movement of a wire member off from said wire-support means in response to engagement of said holding arms with said wire member.

8. A machine as defined in claim 1, wherein said clamping jaws, and the portions of said holding arms opposite thereto, are oriented to establish a curvature of said wire such that the portions of said wire initially resting on said abutments are raised above said abutments on closure of said jaws against said opposite portions.

9. A machine for forming and installing wire arches, comprising;

a frame;

ground-engaging wheel means rotatably mounted on said frame;

transverse shaft means rotatably mounted on said frame parallel to the axis of said wheel means;

a pair of radius arms secured to said shaft adjacent the opposite ends thereof, respectively, in substantially coplanar relationship;

a planetary shaft rotatably mounted on each of said radius arms on an axis substantially parallel to said transverse shaft means;

orbital positioning means interconnecting said planetary shafts and said frame, and adapted to maintain a predetermined rotary angular position of said planetary shafts with respect to said frame;

a holding arm secured to and extending radially from each of said planetary shafts, each of said holding arms having an abutment projecting tangentially with respect to said planetary shafts;

cam means normally fixed with respect to each of said radius arms;

a fulcrum member fixed with respect to said holding arms and said planetary shaft;

a bending arm pivotally mounted on said fulcrum member, and having a clamping jaw disposed to bear against said holding arm on rotation of said bending arm, said bending arm also having cam follower means disposed to interact with said cam means on rotation of said radius arms to bend a wire piece against said abutment to produce an arch configuration having its ends-extending downward, and then grasp said wire; and drive means for rotating said transverse shaft in predetermined relationship to said ground-engaging wheel means.

10. A machine for forming and installing wire arches, comprising:

a frame;

ground-engaging wheel means rotatably mounted on said frame;

transverse shaft means rotatably mounted on same frame parallel to the axis of said wheel means;

a pair of radius arms secured to said shaft adjacent the opposite ends thereof, respectively, in substantially coplanar relationship;

a planetary shaft rotatably mounted on each of said radius arms on an axis substantially parallel to said transverse shaft means;

orbital positioning means interconnecting said planetary shafts and said frame, and adapted to maintain a predetermined rotary angular position of said planetary shafts with respect to said frame;

wire-bending means mounted on each of said planetary shafts;

cam means normally fixed with respect to each of said radius arms, and adapted to actuate said wire-bending means to establish an arch configuration in a wire piece on rotation of said planetary shafts with respect to said radius arms; and drive means for rotating said transverse shaft in predetermined relationship to said ground-engaging wheel means.

* * * * *